July 18, 1944.  M. E. REAGAN  2,354,143
CONTROL SYSTEM
Filed Aug. 12, 1942
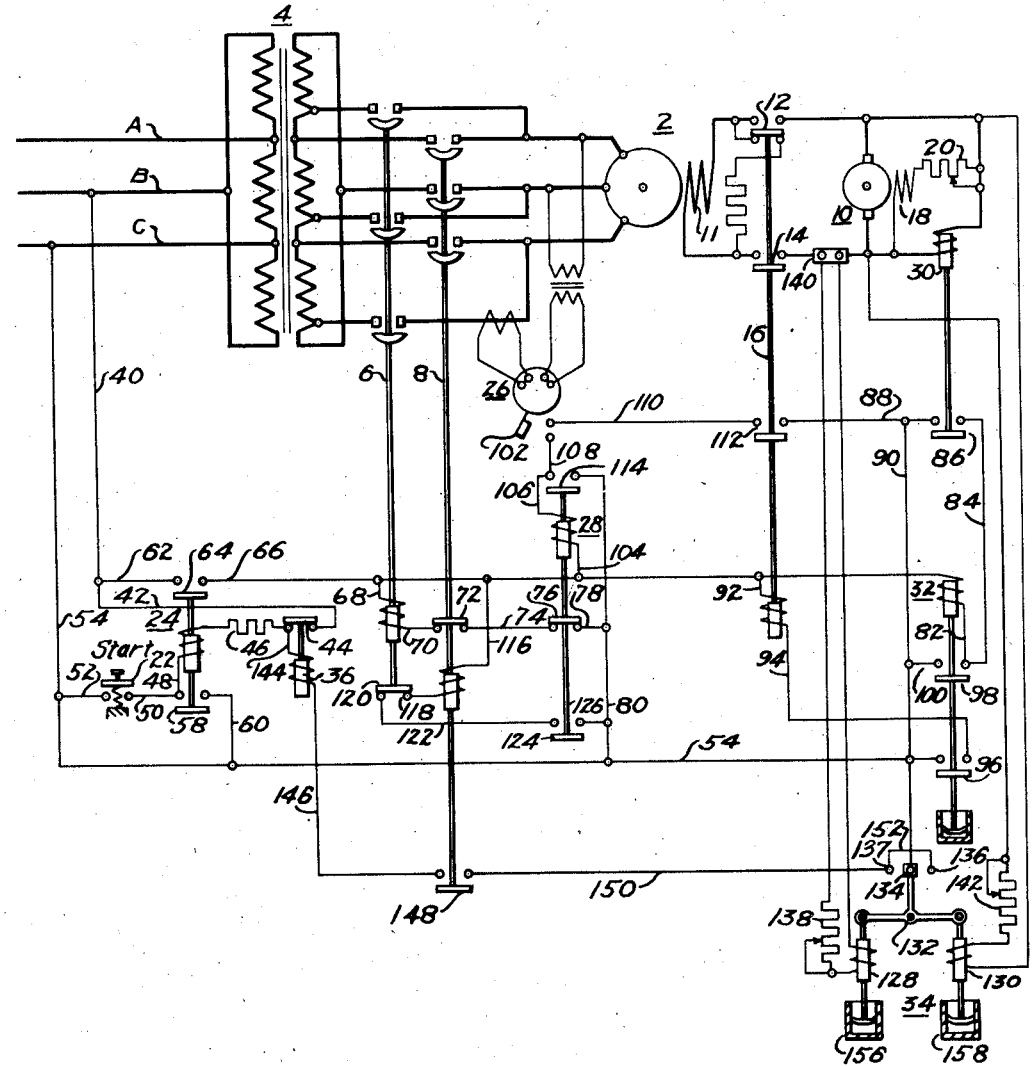
WITNESSES:
INVENTOR
Maurice E. Reagan
BY
ATTORNEY Patented July 18, 1944

2,354,143

UNITED STATES PATENT OFFICE 2,354,143

CONTROL SYSTEM

Maurice E. Reagan, Pittsburgh, Pa., assignor to Westinghouse Electric & Manufacturing Company, East Pittsburgh, Pa., a corporation of Pennsylvania Application August 12, 1942, Serial No. 454,534

3 Claims. (Cl. 172—289)

The present invention relates, generally, to control systems, and, more particularly, to control systems for dynamoelectric machines which depend upon the proper energization of their field windings for their proper operation.

In the operation of synchronous condensers and particularly such condensers that are disposed at remote automatically-operated substations, it is undesirable to permit a condenser to continue to operate in the event that such faults as open-circuit or short-circuit of the condenser field winding should occur.

An object of the invention is to provide a control system for a dynamoelectric machine which shall function in response to fault conditions in its excitation circuit, such as open-circuited or short-circuited field windings or connections, to disconnect the machine from its source of power.

Another object of the invention is to provide a control system for a dynamoelectric machine which shall function by sequential operation of the several elements of the system to place the machine in operation and to take the machine out of operation in the event that either open-circuit or short-circuit conditions occur in its field circuit.

A further object of the invention is to provide for utilizing a balanced relay for providing field failure protection to a synchronous condenser.

Other objects and advantages of the invention will be apparent from the following detailed description taken in connection with the accompanying drawing which is a diagrammatic representation of a control system for a synchronous machine embodying the principal features of the invention.

In practicing the invention in one form thereof, a synchronous dynamoelectric machine 2, which may be in the form of a synchronous condenser, is disposed to be energized from a source of alternating current power indicated by the conductors A, B, and C through a transformer 4 when connected to the starting and running portions of the secondary of the transformer 4 by circuit breakers 6 and 8, respectively.

An exciter generator 10 may be driven by the machine 2 and may be connected to energize the field winding 11 thereof by means of the contact elements 12 and 14 of a circuit control device or contactor 16. The field winding 18 of the exciter 10 is connected to be energized by the exciter 10 through a variable resistor 20.

A starting circuit control device 22 may be operated to place the machine 2 into operation by means of the sequential operation of a master relay 24, the circuit breaker 6, a power factor relay 26, an auxiliary relay 28, the circuit breaker 8, a potential responsive relay 30, an auxiliary relay 32 and the contactor 16.

A balance relay 34 which is responsive to the effect of an open circuit or a short-circuit in the field winding 11 of the machine 2 functions to energize an auxiliary relay 36 which in turn functions to disconnect the machine 2 from its energizing power source.

An understanding of the structure and functioning of the several elements of the system and their cooperative relationships may be had from the following detailed description of the operation of the system:

When it is desired to place the synchronous machine 2 into operation, the starting circuit control device 22 may be actuated to close an energizing circuit for the master relay 24 which extends from the conductor B through a conductor 40, a conductor 42, a contact element 44 of the relay 36, a current limiting resistor 46, the winding of the relay 24, conductors 48 and 50, the circuit control device 22 and conductors 52 and 54 to the conductor C. When thus actuated, the relay 24 will close its own holding circuit extending from the conductor B through the conductors 40 and 42, the contact element 44, the variable resistor 46, the winding of the relay 24, the conductor 48, a contact element 58 of the the relay 24, and conductors 60 and 54 to the conductor C.

The relay 24 will close an energizing circuit for the circuit breaker 6 extending from the conductor B through the conductors 40 and 62, a contact element 64 of the relay 24, conductors 66 and 68, the closing winding of the circuit breaker 6, a conductor 70, a contact element 72 of the circuit breaker 8, a conductor 74, a contact element 76 of the relay 28, and conductors 78, 80, and 54 to the conductor C. The closure of the circuit breaker 6 will connect the synchronous machine 2 to the starting winding of the secondary of the transformer 4 and the machine will be accelerated as an induction motor in a well known manner.

As the speed of the synchronous machine 2 and its exciter 10 increases, the output potential of the exciter will increase and at a predetermined exciter potential, which may be approximately the desired normal exciter potential, the voltage responsive relay 30 which is connected to be energized by the exciter 10 will be actuated. The relay 30 will close an energizing circuit for the auxiliary relay 32 which extends from the conductor B through the conductors 40 and 62, the contact element 64, the conductor 66, the winding of the relay 32, conductors 82 and 84, a contact element 86 of the relay 30, and conductors 88, 90 and 54 to the conductor C. The relay 32 is a slow-to-pick-up relay interposed for the purpose of insuring that the desired exciter potential has been attained before connecting the exciter to the field winding of the synchronous machine. When the relay 32 has been actuated, it will close an energizing circuit for the contactor 16 extending from the conductor B through the conductors 40 and 62, the contact element 64, conductors 66 and 92, the winding of the relay 16, a conductor 94, a contact element 96 of the relay 32 and the conductor 54 to the conductor C. The relay 32 also closes its own holding circuit by means of its contact element 98 which connects the conductor 82 to the conductor 94 of its original energizing circuit through a conductor 100.

The actuation of the contactor 16 will cause its contact elements 12 and 14 to close the circuit connecting the field winding 11 of the synchronous machine 2 to be energized by the exciter 10.

As the field excitation of the synchronous machine 2 builds up, as a result of the energization of its field winding by the exciter 10, the power factor of the synchronous machine load will change from lagging to leading, and in so doing the power factor meter 26 will actuate its contact element 102 to closed circuit position. The contact element 102 will close an energizing circuit for the auxiliary relay 28 which extends from the conductor B through the conductors 40 and 62, the contact element 64, conductors 66 and 104, the winding of the relay 28, conductors 106 and 108, the contact element 102, the conductor 110, a contact element 112 of the contactor 16 and the conductors 88, 90 and 54 to the conductor C. The relay 28 will close its own holding circuit by means of its contact element 114 and the conductor 80 which interconnect the conductors 106 and 54 of the original energizing circuit for the relay 28.

The contact element 76 will be moved to open circuit position by the actuation of the relay 28 to thereby open the holding circuit for the winding of the circuit control device 6, and the circuit breaker 6 will move to open circuit position. The opening of the circuit breaker 6 after the closure of the relay 28 will close the energizing circuit for the circuit breaker 8 which extends from the conductor B through the conductors 40 and 62, the contact element 64, conductors 66 and 116, the closing winding of the circuit breaker 8, a conductor 118, a contact element 120, a conductor 122, a contact element 124 of the relay 28 and conductors 126, 80 and 54 to the conductor C. The closure of the circuit breaker 8 will apply the full running potential from the secondary of the transformer 4 to the synchronous machine 2, and it will then be in normal operation.

The balance relay 34 comprises a pair of solenoids 128 and 130 which are connected into operative relation with a pivoted arm 132 on which is mounted a contact element 134. The solenoid 128 is connected to be energized through calibrating resistor 138 by the potential drop across a shunt device 140 which is connected in the circuit between the exciter 10 and the field winding 11. The solenoid 128 is thus energized and exerts a pull upon the pivoted arm 132 in accordance with the current flow in the field winding 11. The solenoid 130 is connected to be energized by the exciter 10 through a calibrating resistor 142 and is thus energized and exerts a pull upon the pivoted arm 132 in accordance with the output potential of the exciter 10. The calibrating resistors 138 and 142 may be so adjusted that with normal current flowing in the field winding 11, the pulls of the solenoids 128 and 130 on the pivoted arm 132 will be so balanced that the arm will be held in a balanced position.

In the event that an open circuit should occur in the field winding 11 or in the conductors connecting the field winding to the exciter 10, the solenoid 128 will be deenergized and the pull of the solenoid 130 will cause the contact element 134 to be moved to closed circuit position with respect to a fixed contact element 136. The engagement of the contact elements 134 and 136 will close an energizing circuit for the auxiliary relay 36 extending from conductor B through the conductors 40 and 42, the contact element 44, a conductor 144, the winding of the relay 36, a conductor 146, a contact element 148 actuated by the circuit breaker 8, conductors 150 and 152, the contact element 134, and the conductors 90 and 54 to the conductor C. The energization of the relay 36 will cause its contact element 44 to open to thereby break the holding circuit for the relay 24 and permit the relay 24 to be released. The release of the relay 24 will cause the contact element 64 to move to open circuit position to thereby deenergize the winding of the circuit breaker 8, the winding of the relay 28, the winding of the contactor 16 and the winding of the relay 32. The circuit breaker 8 will thus open to deenergize the synchronous machine 2 and the contactor 16 will open to disconnect the field winding 11 from the exciter 10.

The balance relay 34 is also responsive to short circuit conditions in the field winding 11 or faults in the field winding 11 which result in current flow in the field winding out of proportion to the potential of the exciter 10 applied thereto. Should such a short circuit occur in the winding 11, the field current will increase to cause an increase in the energization of the solenoid 128 thus causing an unbalance in the forces acting on the pivoted arm 132 to move the contact element 134 to closed circuit position with respect to a fixed contact element 137. The contact element 134 will close an energizing circuit for the relay 36 which extends from the conductor B through the conductors 40 and 42, the contact element 44, the conductor 144, the winding of the relay 36, the conductor 146, the contact element 148, the conductor 150, the contact elements 134 and 137 and the conductors 90 and 54 to the conductor C. The actuation of the relay 36 will function as hereinbefore described to deenergize the synchronous machine and disconnect its field winding 11 from its exciter 10.

The solenoids 128 and 130 may be provided with any suitable damping means such as dashpots 156 and 158, so that the balance relay will not be affected by transient changes in the proportionality between the potential of the exciter 10 and the current in the field winding 11. It is to be particularly noted that the system hereindescribed which responds to variations of the proportionality between the potential of the exciter 10 and the field current provides a means for responding to open circuit conditions of the field winding circuit over a wide range of exciter potentials and field current and that so long as proportionality between these factors remains constant at the predetermined desired value, the values of the exciter potential and field current may be reduced to practically zero without affecting the balance relay 34.

It will be seen that there has been provided in this invention a control system for a dynamo-electric machine which shall function by sequential operation of the several elements of the system to place the machine in operation and to take the machine out of operation in the event that either open circuit or short-circuit conditions occur in its field circuit.

In compliance with the requirements of the patent statutes, there is shown herein a preferred embodiment of the invention. It is to be understood, however, that the invention is not limited to the precise construction shown and described, but is capable of modification by one skilled in the art, the embodiment shown herein being merely illustrative of the principles of the invention.

I claim as my invention:

1. In a control system for a synchronous condenser having a field excitation winding, an exciter for the condenser driven in accordance with the speed thereof, a starting breaker operable to connect the condenser to a source of reduced starting voltage, a master relay initially operable to effect closure of the starting breaker, a circuit for controlling the operation of the master relay, said circuit including normally closed contact members of a lockout relay operable to deenergize the master relay, circuit control means including a field switch operable to connect the field excitation winding to the exciter in response to a predetermined increase in the output potential of the exciter, a running breaker operable to connect the condenser to a source of running voltage, said running breaker having contact means for effecting the opening of the starting breaker in response to the closure of the running breaker, a relay responsive to the power factor of the condenser during the starting period for effecting closure of the running breaker subsequent to the closure of the field switch, a differential relay jointly responsive to the field excitation current and the output potential of the exciter and operable in response to a predetermined variation in the proportionality between said output potential and excitation current to energize the lockout relay to deenergize the master relay and effect the opening of the running breaker, and contact means actuated by the running breaker for rendering the differential relay effective to energize the lockout relay only during the time the running breaker is closed.

2. In a control system for a synchronous condenser, an exciter for the condenser driven by the condenser, starting switch means operable to connect starting potential to the condenser, means including a master relay for energizing the starting switch, relay means responsive to a predetermined output potential of the exciter for connecting the exciter in energizing relation with the field winding of the condenser, running switch means operable to connect running potential to the condenser, circuit control means responsive to predetermined power factor of the condenser and to the operation of said relay means for energizing the running switch means and deenergizing the starting switch means, said master relay being effective when deenergized to deenergize the running switch means, a relay device jointly responsive to the exciting current of the condenser and the exciter potential operable to deenergize the master relay in the event that the proportionality between the exciter potential and the exciting current of the condenser varies from a predetermined value, and switch means responsive to the operation of the running switch means to apply running potential to the condenser for rendering said relay device effective to deenergize the master relay only when the running switch means is closed.

3. In a control system for a synchronous condenser having a field winding, an exciter for the condenser driven by the condenser, an electrically-operated starting switch for applying starting power to the condenser, means including a master relay for energizing the starting switch, means including a field connecting switch responsive to a predetermined output potential of the exciter for connecting the exciter in energizing relation with the field winding of the condenser, an electrically-operated running switch for applying running power to the condenser, means responsive to the power factor of the condenser and to the closure of the field connecting switch for energizing the running switch and deenergizing the starting switch, said master switch being effective when deenergized to deenergize the running switch to deenergize the condenser, an auxiliary relay operable to deenergize the master relay, a balanced relay having opposed operating windings energized in accordance with the field excitation current of the condenser and the potential of the exciter, respectively, operable to effect the operation of the auxiliary relay in response to a predetermined variation in the proportionality between said current and potential, and means responsive to the closure of the running switch for rendering the balanced relay effective to operate the auxiliary relay.

MAURICE E. REAGAN.